United States Patent [19]

Murayama et al.

[11] Patent Number: 4,776,782

[45] Date of Patent: Oct. 11, 1988

[54] ROTATIONAL PLASTIC COMPRESSION MOLDING APPARATUS

[75] Inventors: Kashiwa Murayama, Fujisawa; Osamu Ishii, Chigasaki; Yoshiaki Mochino, Hiratsuka, all of Japan

[73] Assignee: Japan Crown Cork Co. Ltd., Tokyo, Japan

[21] Appl. No.: 481,421

[22] Filed: Apr. 1, 1983

[30] Foreign Application Priority Data

Apr. 6, 1982 [JP] Japan ................................ 57-56021

[51] Int. Cl.$^4$ ........................ B29C 43/58; B29C 43/04
[52] U.S. Cl. ...................................... 425/149; 264/23; 264/40.5; 264/297.6; 264/310; 425/150; 425/174.8 R; 425/348 R; 425/350; 425/438; 425/453; 425/457; 425/809; 425/DIG. 201
[58] Field of Search ................ 425/149, 174.8 R, 261, 425/809, DIG. 5, 150, 348 R, 350, 438, 453, 457, DIG. 201; 264/297.6, 310, 318

*Primary Examiner*—James Lowe
*Attorney, Agent, or Firm*—Beveridge, DeGrandi & Weilacher

[57] ABSTRACT

A rotational plastic compression molding apparatus including a plurality of circumferentially spaced female molds and a plurality of circumferentially spaced male molds cooperating respectively with the plurality of the female molds. The female molds and the male molds are rotated in synchronism and thus moved round successively through a material loading zone, a compression molding zone and an article discharge zone. In the material loading zone and the article discharge zone, each said female mold and each corresponding mold are maintained in a spaced-apart inoperative relation, and in the compression molding zone, they are maintained in an approaching operative relation to define a mold space therebetween. In the material loading zone, a heat-melted plastic material is loaded in the female molds, and in the article discharge zone, the compression-molded plastic article is discharged from between each said female mold and each corresponding male mold.

24 Claims, 7 Drawing Sheets

FIG. 4-A
FIG. 4-B
FIG. 4-C
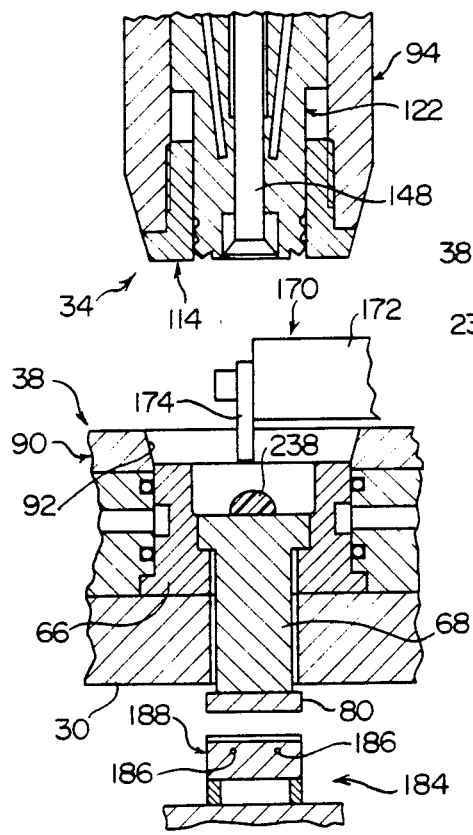
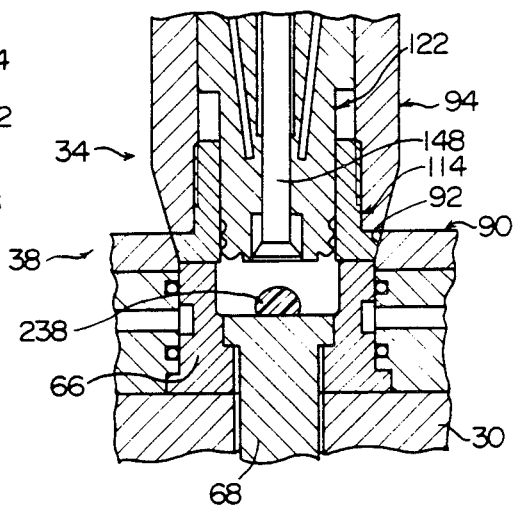
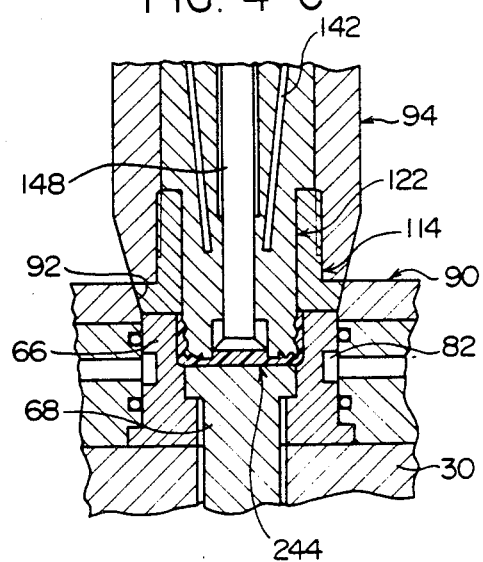

FIG. 4-D
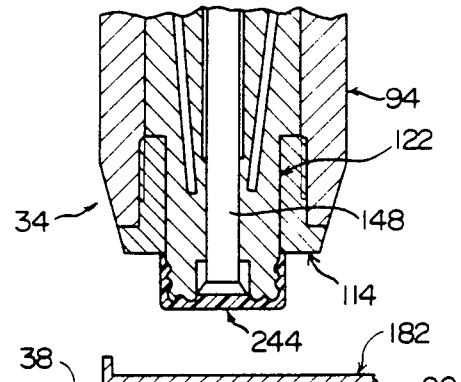
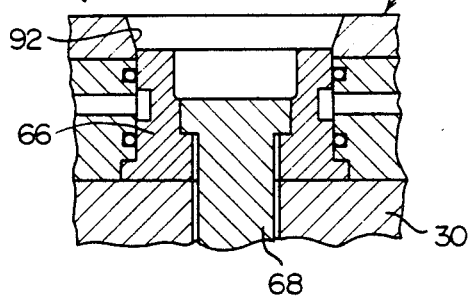
FIG. 4-E
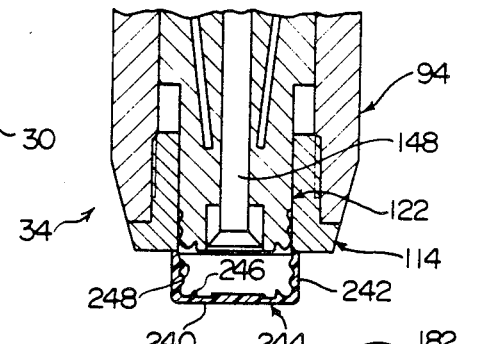
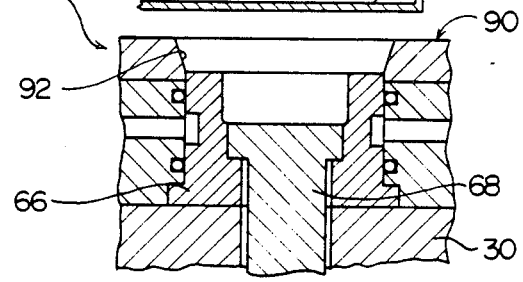

ROTATIONAL PLASTIC COMPRESSION MOLDING APPARATUS

FIELD OF THE INVENTION

This invention relates to a rotational plastic compression molding apparatus suitable, although not exclusively, for molding plastic container closures.

DESCRIPTION OF THE PRIOR ART

As is well known to those skilled in the art, container closures molded from plastics such as polyethylene or polypropylene have tended to come into widespread use for containers such as bottles for drinks in place of metallic closures. These plastic closures are generally produced by injection molding from suitable plastic materials.

In the production of plastic container closures by injection molding, it is necessary to inject a plastic material not only into a molding space defined within a mold, but also into a so-called runner (plastic flow passage) for leading the plastic material to the molding space. This causes the disadvantage that the plastic material injected into the runner is wasted, and since the molding speed is restricted by various causes, container closures cannot be molded at the required high speeds.

It has been proposed on the other hand to produce plastic container closures by compression molding in place of injection molding. According to this technique, the runner is not required, and the plastic material is not wasted. Conventional compression molding apparatuses, however, have the serious defect that the molding speed becomes lower than that in injection molding.

SUMMARY OF THE INVENTION

It is a primary object of this invention to provide a novel and excellent rotational plastic compression molding apparatus which can produce molded plastic articles such as plastic container closures at higher molding speeds than in ordinary injection molding.

Another object of this invention is to provided a novel and excellent rotational plastic compression molding apparatus capable of compression molding plastic container closures each having a top panel wall and a cylindrical skirt wall extending downwardly from the peripheral edge of the top panel wall without substantially forming burrs which in usual compression molding inevitably occure extending from the lower end of the skirt wall.

According to this invention, there is provided a rotational plastic compression molding apparatus comprising a plurality of circumferentially spaced female molds, a plurality of circumferentially spaced male molds cooperating respectively with the plurality of the female molds, rotationally driving means for rotating the female molds and the male molds in synchronism, thereby moving them around successively through a material loading zone, a compression molding zone and an article discharge zone, mold relation control means for maintaining each said female mold and each corresponding male mold in a spaced-apart inoperative relation in the material loading zone and the article discharge zone, and in an approaching operative relation to define a mold space therebetween in the compression molding zone, material loading means for loading a heat-melted plastic material into the female molds in the material loading zone, and article discharge means for discharging the compression-molded plastic article from between each female mold each corresponding male mold in the article discharge zone.

When the plastic article to be produced by compression molding is a container closure having a top panel wall and a cylindrical skirt wall extending downwardly from the top panel wall, the rotational plastic compression molding apparatus of this invention, in its preferred embodiment, has a sliding piece in each male mold or each female mold. The sliding piece is disposed for free movement from its normal position in a direction away from the female mold or the male mold, and its forward end surface defines at least a part of the inside or outside surface of the top panel wall of the container closure. When the pressure acting on the plastic material in the mold passage space becomes excessive, the sliding piece is moved from the normal position in a direction away from the female mold or the male mold, whereby the formation of so-called burrs, which is inevitable in the prior art, can be substantially avoided.

BRIEF DESCRIPTION OF THE DRAWINGS

FIGS. 4-A, 4-B, 4-C, 4-D and 4-E are partial longitudinal sectional views for illustrating the interaction of the male mold and the female mold;

DETAILED DESCRIPTION OF THE PREFERRED EMBODIMENTS

The present invention is described below in detail with reference to the accompanying drawings showing the preferred embodiments of the rotational plastic compression molding apparatus constructed in accordance with this invention.

Figure 1:
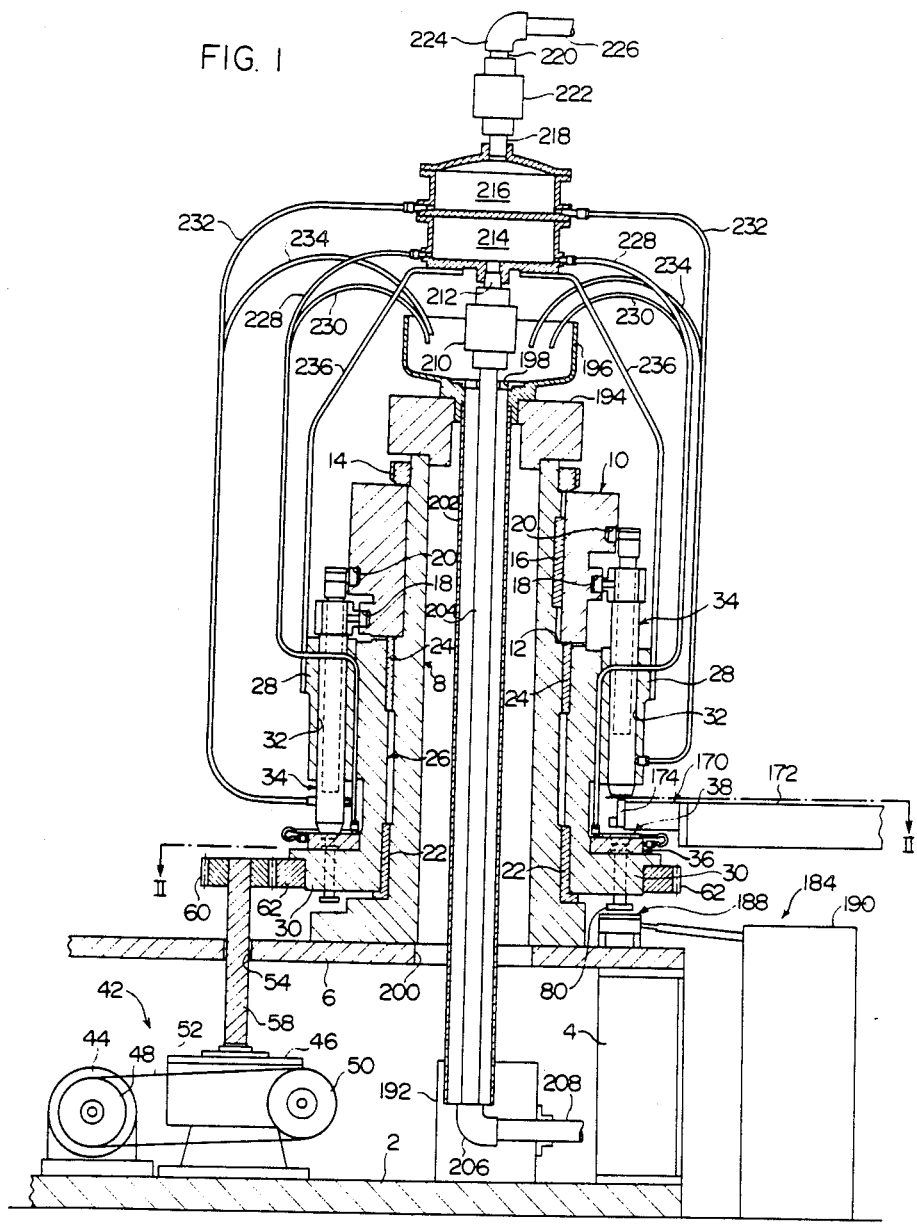
FIG. 1 is a longitudinal sectional view showing one specific embodiment of the rotational plastic compression molding apparatus constructed in accordance with this invention.
Figure 2:
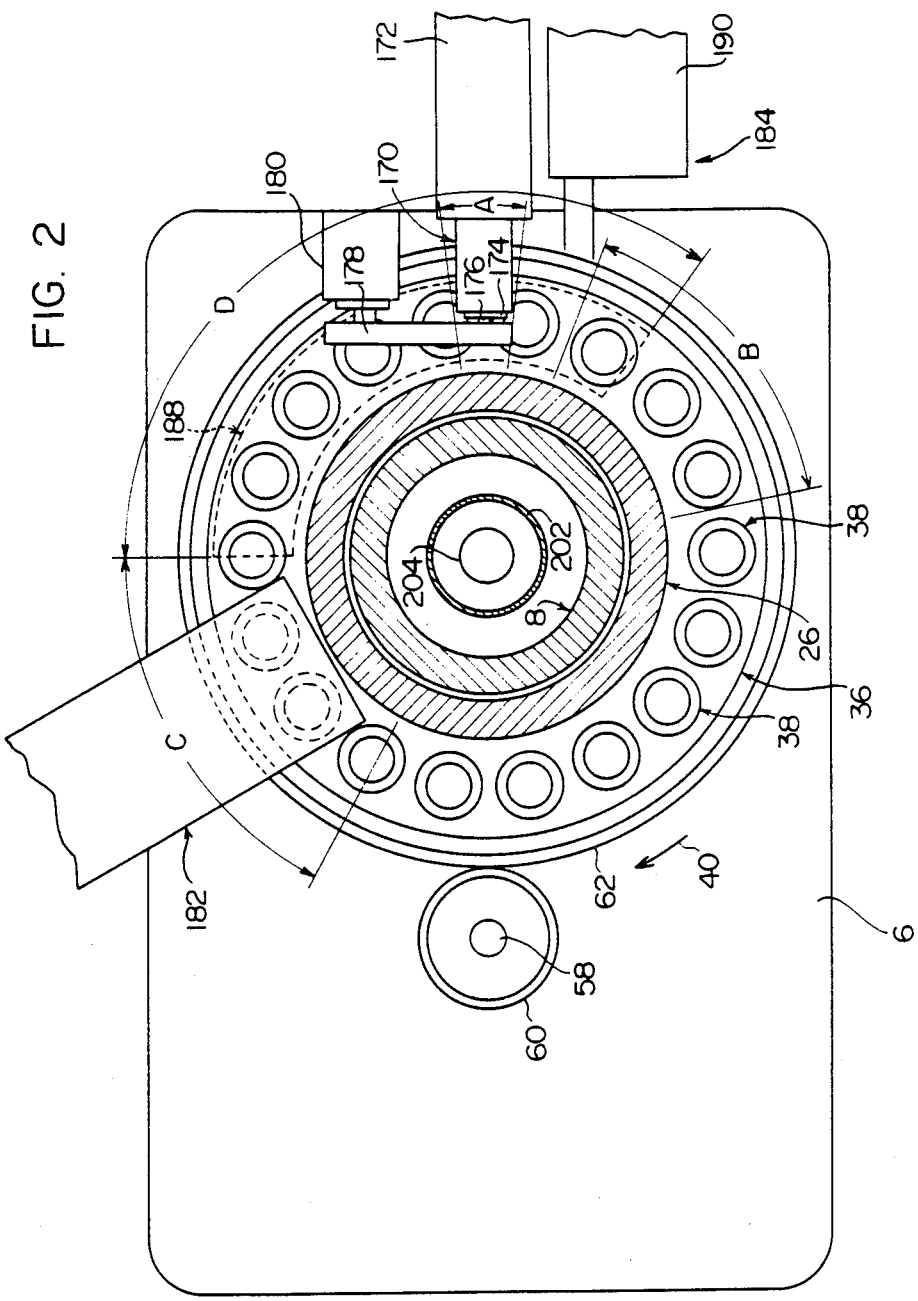
FIG. 2 is a transverse sectional view taken along line II—II of FIG. 1.

With reference to FIGS. 1 and 2, particularly FIG. 1, the illustrated apparatus has a base stand 2. Support legs 4 (only one of which is shown in FIG. 1) are set firmly at the four corner portions of the base stand 2, and these support legs 4 support a support stand 6 located above, and at a required distance from, the base stand 2. An upstanding support member 8 generally in a nearly cylindrical shape is fixed to the support stand 6.

An annular cam block 10 is fixed to the outside of the upper half portion of the upstanding support member 8. The manner of fixing the annular cam block 10 to the upstanding support member 8 is as follows: An annular shoulder portion 12 is formed in the peripheral surface of the upstanding support member 8, and the inner circumferential edge portion of the lower end surface of the annular cam block 10 abuts against the annular shoulder portion 12. A male thread is formed in the upper end portion of the peripheral surface of the upstanding support member 8, and a large-sized clamping nut 4 is threadedly fitted with the male thread. Thus, by the cooperative action of the annular shoulder portion 12 and the clamping nut 14, the annular cam block 10 is fixed to a predetermined position of the upstanding support member 8. Furthermore, a key groove is provided in each of the peripheral surface of the upstanding support member 8 and the inner circumferential surface of the annular cam block 10. A key 16 is inserted in the key grooves whereby the annular cam block 10 is held at a predetermined angular position with respect to the upstanding support member 8 and the rotation of the annular cam block 10 relative to the upstanding support member 8 is exactly hampered. A first cam groove 18 and a second cam groove 20 extending continuously in the circumferential direction are formed on the peripheral surface of the annular cam block 10 (these first and second cam grooves 18 and 20 will be described further hereinafter).

A rotating member 26 generally in a nearly cylindrical shape is rotatably mounted on the outside of the lower half portion of the upstanding support member 8 through a lower bearing 22 and an upper bearing 24. A relatively thick upper flange 28 is formed in the upper half portion of the rotating member 26, and a lower flange 30 is formed at the lower end portion of the rotating member 26. The upper flange 28 has formed therein a plurality of (for example, 18) holes spaced circumferentially and extending therethrough vertically, and a male mold shown generally at 34 is mounted in each of the holes 32 vertically slidably (the structure of the male mold 34 will be described in detail hereinafter). On the other hand, an annular member 36 is fixed to the upper surface of the lower flange 30, and a plurality of (for example, 18) circumferentially spaced female molds 38 (see FIG. 2) are formed in the annular member 36 (the structure of the female mold 38 will be described in detail hereinafter). It is important that each of the female molds 38 should be in vertical alignment with each of the male molds 34.

The illustrated apparatus further includes rotationally driving means shown generally at 42 for rotating the rotating member 26 at a predetermined speed in the direction of an arrow 40 (FIG. 2). The rotationally driving means 42 comprises an electric motor 44 and a decelerator 46 provided on the base stand 2. A toothed belt wheeel 48 is fixed to the output shaft of the electric motor 44, and a toothed belt wheel 50, to the input shaft of the decelerator 46. An endless timing belt 52 is wrapped over the toothed belt wheels 48 and 50. On the other hand, a through hole 54 is formed in the support stand 6. The output shaft 58 of the decelerator 46 projects above the support stand 6 through the throughhole 54, and a gear 60 is fixed to the upper end of the output shaft 58. An annular gear 62 is fixed to the peripheral surface of the lower flange 30 of the rotating member 26 and is in mesh with the gear 60. It will be appreciated that with the aforesaid construction, when the output shaft of the electric motor 44 is rotated in the direction of arrow 40, this rotation is transmitted to the rotating member 26 through the decelerator 46 and the gears 60 and 62 to rotate the rotating member 26 in the direction of arrow 40 (FIG. 2), and when the rotating member 26 is rotated in the direction of arrow 40, the male mold 34 and the female mold 38 are also rotated in the direction of arrow 40 as a unit. In the illustrated embodiment, the driving means 42 continuously rotates the rotating member 26 in the direction of arrow 40, and the male mold 34 and the female mold 38 are successively moved around through a material loading zone shown by letter A in FIG. 2, a compression molding zone shown by letter B and an article discharge zone shown by letter C.

Now, with reference to FIG. 3, the construction of the male mold 34 and the femal mold 38 will be described in detail. For convenience of explanation, the structure of the female mold 38 will first be described. The annular member 36 fixed to the upper surface of the lower flange 30 of the rotating member 26 has formed therein through-holes 64 corresponding respectively to the positions of the female molds 38. A first nearly cylindrical female mold defining member 66 is fixed to each of the through-holes 64, and a second female mold defining member 68 is fixed within the first female mold defining member 66. A downwardly directed shoulder portion 70 is formed at the lower end portion of the through-hole 64, and an annular flange 72 is formed at the lower end portion of the first female mold defining member 66. By causing the annular flange 72 to engage the shoulder portion 70, the vertical position of the first female mold defining member 66 with respect to the annular member 36 is set as prescribed. On the other hand, an upwardly directed shoulder portion 74 is formed in the inner surface of the first female mold defining member 66, and an annular flange 76 is formed in the upper end portion of the second female mold defining member 68. By causing the annular flange 76 to engage the shoulder portion 74, the vertical position of the second female mold defining member 68 with respect to the first female mold defining member 66 is set as prescribed. As will be described in more detail hereinbelow, in the illustrated apparatus, container closures each having a circular top panel wall and a cylindrical skirt wall extending downwardly from the peripheral edge of the top panel wall are produced by compression molding. The upper surface of the second female mold defining member 68 and the upper portion of the inner circumferential surface of the first female mold defining member 66 (more specifically the portion above the upper surface of the second female mold defining member 68) define a female mold surface for compression molding the container closures. In the illustrated embodiment, the lower flange 30 of the rotating member 26 also has a through hole 78 in vertical alignment with the through hole 64, and the second female mold defining member 68 projects downwardly through the through-hole 78 and beyond the lower surface of the rotating member 26. To the lower end of the second female mold defining member 68 is fixed a member 80 to be heated. As will be stated hereinafter, the member 80 to be heated is heated by high frequency induction heating, and the heat of the member 80 is transmitted to the second female mold defining member 68. The member 80 is made of a material, such as iron, suitable for high frequency induction heating, and the second female mold defining member 68 is conveniently made of a material having a high thermal conductivity, such as copper or copper-base alloys.

In the illustrated embodiment, an annular circulating groove 82 is formed on the peripheral surface of the first female mold defining member 66, and in relation to the circulating groove 82, an introduction passage 84 and a discharge passage 86 are formed in the annular member 36. As will be described in detail hereinafter, a cooling medium introduced through the introduction passage 84 is circulated through the circulating proove 82, and then discharged through the discharge passage 86. A plate 90 is fixed to the upper surface of the annular member 36 at a position corresponding to each of the female molds 38. Each plate 90 has formed therein a through-hole 92 in alignment with each of the through-holes 64 formed in the annular member 36. As will be described hereinafter, the lower end portion of the male mold 34 is inserted into each through-hole 92 whose inside diameter progressively decreases downwardly.

Now, the male molds shown generally at 34 will be described. Each of the male molds 34 has a cylindrical member 94 mounted vertically slidably in each of the plurality of holes 32 formed in the upper flange 28 of the rotating member 26 in circumferentially spaced-apart relation and extending through the flange 28 vertically. A key groove 96 is engraved in the inner circumferential surface of the hole 32 and a key 100 is fixed to the key groove 96 by means of a setscrew 98. On the other hand, the outer circumferential surface of the cylindrical member 94 has engraved therein a key groove 102 for receiving the radially inside portion of the key 100. The length of the key groove 102 in the vertical direction is sufficiently larger than that of the key 100 in the vertical direction. Thus, the cylindrical member 94 can slide vertically relative to the hole 32, but is surely prevented from rotating relative to the hole 32. A solid cylindrical member 104 is mounted vertically slidably within the cylindrical member 94. The solid cylindrical member 104 has a key groove 106 engraved at its peripheral surface, and a key 110 is fixed to the key groove 106 by means of a setscrew 108. On the other hand, the cylindrical member 94 has a key groove 112 engraved at its inner circumferential surface for receiving the radially outside portion of the key 110. The key groove 112 extends downwardly from the upper end of the cylindrical member 94 in a sufficiently larger length than the vertical length of the key 110. Thus, the solid cylindrical member 104 can slide vertically relative to the cylindrical member 94, but is surely prevented from rotating relative to the cylindrical member 94.

A separately formed abutting member 114 is fixed to the lower end of the cylindrical member 94. The abutting member 114 has a cylindrical linking portion 116 and a flange portion 118 formed at the lower end of the linking portion 116. A male thread is formed on the peripheral surface of the linking portion 116, and by threadably engaging the male thread with a female thread formed on the inner surface of the lower end portion of the cylindrical member 94, the abutting member 114 is fixed to the lower end of the cylindrical member 94. The outer circumferential surface of the lower end portion of the male mold 34, which is defined by the outer circumferential surface of the flange portion 118 of the abutting member 114 and the outer circumferential surface of the lower end portion of the cylindrical member 94, progressively decreases in outside diameter downwardly corresponding to the inner circumferential surface of the through-hole 92 formed in the plate 90 of the female mold 38. As will be described hereinafter, when the male mold 34 is lowered from the position shown in FIG. 3, the lower end portion of the male mold 34 is inserted in the through-hole 92 formed in the plate 90 of the female mold 38, and the lower surface of the flange portion 118 of the abutting member 114 is caused to abut against the upper surface of the first female mold defining member 68.

An intermediate linking member 120 is fixed to the lower end of the solid cylindrical member 104 mounted vertically slidably in the cylindrical member 94, and a male mold defining member 122 is fixed to the lower end of the intermediate linking member 120. At the lower end portion of the solid cylindrical member 104, a hole 124 having a relatively small diameter and a hole 126 with a relatively large diameter immediately following the hole 124 and extending to the lower end of the solid cylindrical member 104. A female thread is formed on the inner circumferential surface of the hole 126 having a relatively large diameter. The intermediate linking member 120 has an upper portion 128 having an outside diameter corresponding to the inside diameter of the hole 126 and a large-diameter lower portion 130 having an outside diameter corresponding to the inside diameter of the cylindrical member 94. A male thread is formed on the peripheral surface of the upper portion 128 of the intermediate linking member 120, and by threadedly engaging the male thread with the female thread formed on the inner circumferential surface of the hole 126, the intermediate linking member 120 is fixed as prescribed to the lower end of the solid cylindrical member 104. A hole 132 is formed at the lower end portion of the large-diameter lower portion of the intermediate linking member 120, and a female thread is formed on the inner circumferential surface of the hole 132. On the other hand, the male mold defining member 122 has an upper portion 134 having an outside diameter corresponding to the inside surface of the hole 132, a large-diameter intermediate portion 136 having an outside diameter corresponding to the inside diameter of the cylindrical member 94 and a lower portion 138 having an outside diameter corresponding to the inside diameter of the abutting member 114 fixed to the lower end of the cylindrical member 94. A male thread is formed on the outer circumferential surface of the upper portion 134 of the male mold defining member 122, and by threadedly engaging the male thread with the female thread formed on the inner circumferential surface of the hole 132, the male mold defining member 122 is fixed as prescribed to the lower end of the intermediate linking member 120.

Figure 3:
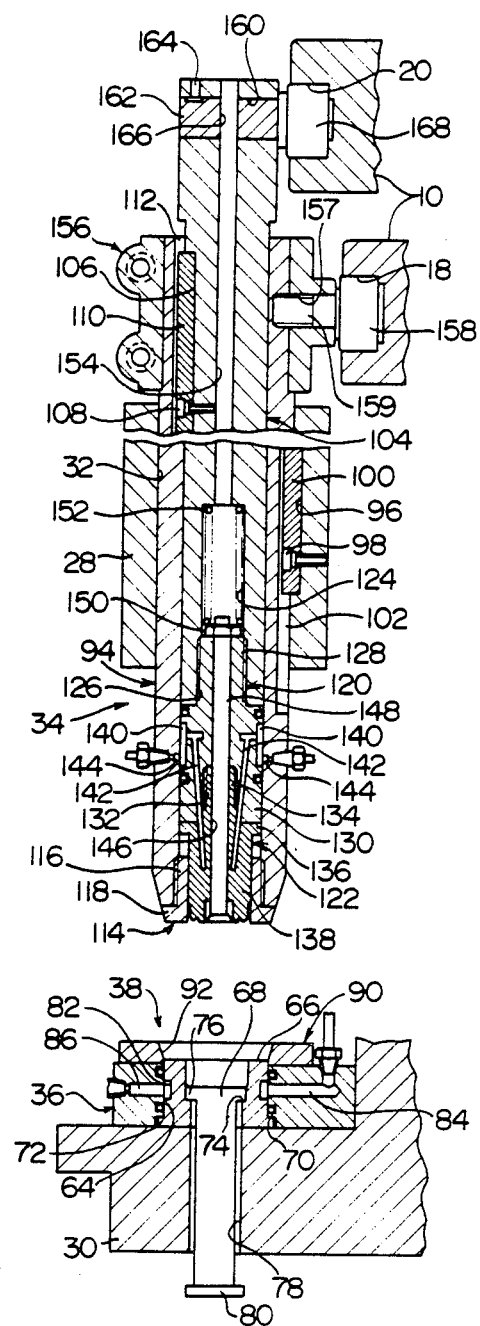
FIG. 3 is a partial longitudinal sectional view showing a male mold and a female mold.

On the peripheral surface of the large-diameter lower portion 130 of the intermediate linking member 120 are formed a plurality of circumferentially spaced arcuate circulating grooves 140 (two arcuate circulating grooves 140 are shown in FIG. 3). In relation to each of the arcuate circulating grooves 140, a circulating passage 142 extending radially inwardly from the arcuate circulating groove 140 and then downwardly is formed in the intermediate linking member 120 and the male mold defining member 122. Each of the circulating grooves 140 and the circulating passage 142 is divided circumferentially into two sections excepting the lower end portion of the circulating passage 142. One section constitutes an introduction groove or an introduction passage, and the other constitutes a discharge groove or a discharge passage. Furthermore, in relation to the arcuate circulating groove 140, the cylindrical member 94 has formed therein a plurality of communicating passages 144 communicating respectively with the arcuate circulating grooves 140. Each of these communicating passages 144 is also divided circumferentially into two sections, one of which communicates with the introduction groove side of the arcuate circulating groove 140 and the other of which, with the discharge groove side of the arcuate circulating groove 140. As will be described in detail hereinafter, a cooling medium is introduced through the introduction sides of the communicating passage 144, the arcuate circulating groove 140 and the circulating passage 142, and discharged through the discharge sides of the circulating passage 142, the arcuate circulating groove 140 and the communicating passage 144. Each of the arcuate circulating grooves 140 formed on the peripheral surface of the large-diameter lower portion 30 of the intermediate linking member 120 has a sufficiently large height in the vertical direction so that as will be described hereinafter, it is always maintained communicating with the communicating passage 144 in the cylindrical member 94 even when the solid cylindrical member 104 slides vertically relative to the cylindrical member 94 and consequently the vertical position of the intermediate linking member 120 relative to the cylindrical member 94 changes.

In the illustrated embodiment, the intermediate linking member 120 and the male mold defining member 122 have formed therein a vertically extending through-hole 146, and a sliding piece 148 is mounted therein vertically slidably. The lower end portion of the through hole 146 is somewhat larger in diameter than its other part, and corresponding to this, a large-diameter portion having substantially the same outside diameter as the inside diameter of the large-diameter portion at the lower end portion of the through-hole 146 is formed at the lower end of the sliding piece 148. An abutting member 150 such as a nut is fixed to the upper end of the sliding piece 148 extending upwardly beyond the intermediate linking member 120. Within the hole 124 formed in the solid cylindrical member 104 is disposed a spring means 152 composed of compression spring having an upper end engaging the upper end surface of the hole 124 and a lower end engaging the abutting member 150. The spring member 152 elastically biases the sliding piece 148 downwardly to hold it elastically at a normal position at which the abutting member 150 abuts against the upper surface of the intermediate linking member 120 as shown in FIG. 3. At this normal position, the surface of the forward end of the sliding piece 148, i.e. the lower surface of the large-diameter portion formed at the lower end of the sliding piece 148, is located at substantially the same height as the lower surface of the male mold defining member 122. On the other hand, as will be described hereinafter in detail, when a pressure above a certain limit acts on the forward end surface of the sliding piece 148 during compression molding, the sliding piece 148 is moved upwardly relative to the male mold defining member 122 and the intermediate linking member 120 against the elastic biasing action of the spring member 152. The solid cylindrical member 104 has formed therein an air vent 154 extending from the hole 124 to the upper end of the solid cylindrical member 104.

The upper end portion of the cylindrical member 94 projects upwardly beyond the upper end of the upper flange 28 of the rotating member 26. A journalling bracket 156 is fixed to the peripheral surface of the upper end portion of the cylindrical member 94. A radially extending hole 157 is formed in the journalling bracket 156 and the cylindrical member 94, and a shaft 159 is threadably fitted in the hole 157. A follower roller 158 positioned in the first cam groove 18 formed on the peripheral surface of the annular cam block 10 is rotatably mounted on the forward end portion of the shaft 159 which extends beyond the journalling bracket 156. Likewise, the upper end portion of the solid cylindrical member 104 mounted vertically slidably on the cylindrical member 94 projects upwardly beyond the upper end of the cylindrical member 94. A hole 160 extending in the diametrical direction of the solid cylindrical member 104 is formed in the upper end of the solid cylindrical member 104. A shaft 162 is inserted in the hole 160 and fixed at a predetermined position by means of a suitable setscrew 164. The shaft 162 has formed therein an air vent 166 in alignment with the air vent 154 so as not to interrupt the air vent 154 formed in the solid cylindrical member 104. A follower roller 168 positioned in the second cam groove 20 formed on the peripheral surface of the annular cam block 10 is rotatably mounted on the forward end portion of the shaft 162 projecting from the solid cylindrical member 104. The first cam groove 18 and the follower roller 158 cooperating with it, and the second cam groove 20 and the follower roller 168 cooperating with it constitute a mold relation control means for moving the male mold 34 up and down relative to the female mold 38 and positioning them in a required relation when the male mold 34 and the female mold 38 are moved round successively through the material loading zone A, the compression molding zone B and the article discharge zone C shown in FIG. 2. In the illustrated embodiment, the male mold 34 and the female mold 38 are positioned in a required relation by moving the male mold 34 up and down. If desired, instead of it, or in addition to it, the male mold 34 and the female mold 38 can be positioned in a required relation by moving the female mold 38 up and down.

With reference to FIGS. 1 and 2, there is provided a material loading means generally shown at 170 for loading a suitable plastic material such as polyethylene, polypropylene or a vinyl chloride resin in the heat-melted state in the female mold 38 in the material loading zone A. The material loading means 170 which is known per se has an extruder 172 for melting the plastic material and extruding it. An extrusion opening (not shown) is formed at the front surface (the left end surface in FIGS. 1 and 2) of the extruder 172, and the heat-melted plastic material is extruded forwardly (in the left direction in FIGS. 1 and 2) through the extrusion opening. The material loading means 170 further has a cutting blade 174 rotatably disposed at the front surface of the extruder 172. As shown in FIG. 2, the support shaft 176 of the cutting blade 174 is connected to an electric motor 180 through a suitable power transmission mechanism 178. As will be readily understood from FIG. 4-A, the front surface portion of the extruder 172 and the cutting blade 174 are positioned between the female mold 38 and the male mold 34 at an elevated position in the material loading zone A. The cutting blade 174 rotationally driven by the motor 180 moves across the extrusion opening formed at the front surface of the extruder 172 and cuts the molten plastic extruded from the extrusion opening and load the cut material in the female mold 38 positioned beneath it, as will be described specifically hereinafter.

In the article discharge zone shown by C in FIG. 2, an article discharge means 182 is provided for discharging a molded article (a container closure in the illustraed embodiment) removed from the female mold 38 and the male mold 34. As will be readily understood by referring to FIGS. 4-D and 4-E together with FIG. 2, the illustrated article discharge means 182 is constructed of a chute having an upstream end portion positioned between the female mold 38 and the male mold 34 at an elevated position in the article discharge zone C. As will be described in more detail hereinafter, the molded article (i.e., the container closure) molded within a molding space defined by the female mold 38 and the lowered male mold 34 is raised with the male mold 34 and removed from the female mold 38. Then, it is removed from the female mold 34 and dropped onto the upstream end portion of the article discharge means 182 formed of a chute, and delivered to a suitable place through the article discharge means 182.

With reference to FIG. 4-A together with FIGS. 1 and 2, the illustrated embodiment includes a heating means shown generally at 184 which is adapted to heat the female mold 38 at least between the article discharge zone C and the material loadig zone A viewed in the rotating direction of the male mold 34 and the female mold 38, specifically in the heating zone shown by D in FIG. 2 in the illustrated embodiment ranging from a position immediately downstream of the article discharge zone C to the upstream portion of the compression molding zone B downstream of the material loading zone A. The heating means 184 is constructed of a high frequency induction heater comprising a coil assembly 188 having a high frequency induction coil 186 and a high frequency generating source 190 for supplying a high frequency current to the coil 186. The coil assembly 188 is disposed on the support stand 6 and extends in an arcuate shape along the moving path of the female mold 38 below the female mold 38 in the heating zone D, more specifically below the member 80 annexed to the female mold 38. In the heating element 184 of the aforesaid structure, a high frequency current supplied from the high frequency source 190 flows through the high frequency induction coil 186 of the coil assembly 188 to heat the member 80 annexed to the female mold 38 by high frequency induction. The heat of the member 80 so heated is transmitted to the second female mold defining member 68 of the female mold 38 to heat the female mold 38 to a required temperature.

In the illustrated embodiment, there are further provided a first cooling means for circulating a suitable cooling medium such as water through the circulating groove 82 formed in the female mold 38 and a second cooling means for circulating a suitable cooling medium such as water through the arcuate circulating groove 140 and the circulating passage 142 formed in the male mold 34.

With reference to FIG. 1, the first and second cooling means will be described. A drain tank 192 is disposed on the base stand 2. An annular supporting block 194 is fixed to the upper surface of the annular cam block 10 fixed to the outside of the upper half portion of the upstanding support member 8 which in turn is fixed to the support stand 6. A drainage receiver 196 with an open top is fixed to the annular supporting block 194. A drainage opening 198 is formed at the central portion of the bottom wall of the drainage receiver 196, and a drainage pipe 202 extends downwardly from the drainage opening 198 to the drain tank 192 through an opening 200 formed in the support stand 6.

A water supply pipe 204 is disposed within the drainage pipe 202. The lower end of the water supply pipe 204 which is located within the drain tank 192 is connected to a water supply pipe 208 through an elbow 206. The water supply pipe 208 extending through the side wall of the drain tank 192 is connected to a supply source (not shown) for supplying cooling water, for example water at about 15° C. On the other hand, a hollow bearing member 210 is fixed to the upper end of the water supply pipe 204, and a hollow shaft 212 connected to the water supply pipe 204 is rotatably mounted on the hollow bearing member 210. A water supply receptacle 214 is secured to the hollow shaft 212. Thus, the water supply receptacle 214 is rotatably mounted at a predetermined position and is connected to the water supply pipe 204 through the hollow shaft 212 and the hollow bearing member 210. To the upper surface of the water supply receptacle 214 is further fixed another water supply receptacle 216. An opening is formed at the top wall of the water supply receptacle 216, and a hollow shaft 218 is connected to the opening. The upper end of the hollow shaft 218 is rotatably connected to a hollow bearing member 222 fixed to the lower end of a hollow shaft 220 and thus connected to the hollow shaft 220. The hollow shaft 220 is connected to a water supply pipe 226 through an elbow 224, and the water supply pipe 226 is connected to a supply source (not shown) for supplying cooling water which may, for example, be water at about 80° C.

A plurality of (18 in the illustrated embodiment) circumferentially spaced water supply openings are formed at the lower end portion of the water supply receptacle 214, and one end of a water supply conduit 228 is connected to each of these water supply openings. The other end of each water supply conduit 228 is connected to each of the introduction passages 84 (see FIG. 3) formed in the annular member 36 disposed in the female mold 38. On the other hand, a drainage conduit 230 is connected to each of the discharge passages 86 (FIG. 3) formed in the annular member 36, and the other end of the drainage conduit 230 is positioned in the drainage receiver 196.

Likewise, a plurality of (18 in the illustrated embodiment) circumferentially spaced water supply openings are formed at the lower end portion of the water supply receptacle 216, and one end of a water supply conduit 232 is connected to each of these water supply openings. The other end of each water supply conduit 232 is bifurcated and connected to the introduction side of each of the two communicating passages 144 (FIG. 3) formed in the cylindrical member 94 of the male mold 34. A drainage conduit 234 is bifurcated at one end and connected to the introduction side of each of the two communicating passages 144. The other end of the drainage conduit 234 is positioned in the drainage receiver 196.

Cooling water supplied to the water supply pipe 208 from the supply source (not shown) is supplied to the water supply receptacle 214 through the water supply pipe 208, the elbow 206 and the water supply pipe 204, and then to each of the introduction passages 84 (FIG. 3) formed in the annular member 36 through each of the water supply conduits 228, and thus introduced into each of the circularing grooves 82 formed in the female mold 38. Water led out from each of the circulating grooves 82 is discharged into the drainage receiver 196 through the discharge passages 86 (FIG. 3) formed in the annular member 36 and the drainage conduits 230 and then into the drain tank 192 through the drainage pipe 202, and finally carried to a suitable place. The female mold 38 is cooled by the aforesaid circulating of the cooling water.

Cooling water supplied to the water supply pipe 226 from the supply source (not shown) is supplied to the water supply receptacle 216, then to the introduction sides of the communicating passages 144 (FIG. 3) formed in the male mold 34 through the water supply conduits 232, and then introduced into the introduction sides of the arcuate circulating grooves 140 and the circulating passages 142 (FIG. 3) formed in the male mold 34. Water led out from the discharge sides of the arcuate circulating grooves 140 and the circulating passages 142 (FIG. 3) is discharged into the drainage receiver 196 through the discharge sides of the communicating passages 144 (FIG. 3) formed in the male mold 34 and the drainage conduits 234, and then carried to a suitable place through the drainage pipe 202 and the drain tank 192. By the aforesaid circulating of the cooling water, the male mold 34 is cooled.

In the illustrated embodiment, the rotating member 26 is rotated continuously in the direction of arrow 40 by the action of the rotationally driving means 42, and following the rotation of the rotating member 26, the male mold 34 and the female mold 38 are also rotated continuously in the direction of arrow 40 in FIG. 2. Hence, the water supply and drainage pipes 228, 230, 232 and 234 provided in relation to each of the male mold 34 and the female mold 38 are rotated following the male mold 34 and the female mold 38, whereby the water supply receptacles 214 and 216 are similarly rotated. In the illustrated embodiment, a plurality of (for example, 8) circumferentially spaced guide rods 236 are disposed in order to rotate the water supply and drainage conduits 228, 230, 232 and 234 and the water supply receptacles 214 and 216 surely and smoothly incident to the rotation of the rotating member 26 and to prevent surely the entanglement of the water supply and discharge conduits 228, 230, 232 and 234 with each other. Each of the plurality of guide rods 236 is fixed at its upper end to the lower surface of the water supply receptacle 214, and its lower end is fixed to the peripheral surface of the upper flange 28 of the rotating member 26. The guide rods 236 surely transmit the rotation of the rotating member 26 to the water supply receptacles 214 and 216 to rotate them as a unit with the rotating member 26, and to rotate surely the water supply and drainage conduits 228, 230, 232 and 234 incident to the rotation of the rotating member 26.

The operation and advantage of the rotational plastic compression molding apparatus described hereinabove will be described below.

With reference to FIGS. 1 and 2, the rotating member 26 is rotated continuously in the direction of arrow 40 in FIG. 2 by the rotationally driving means 42 whereby the male mold 34 and the female mold 38 are continously moved round successively through the material loading zone A, the compression molding zone B and the article discharge zone C.

In the material loading zone A, the male mold 34 is held at its elevated position shown in FIG. 4-A, i.e. at a non-operative position at which it is spaced upwardly from the female mold 38. In the material loading zone A, a plastic material 238 in the heat-melted state is loaded in the female mold 38 by the material loading means 170. More specifically, the molten plastic material is extruded through the extrusion opening (not shown) formed at the front surface of the extruder 172 (the left end surface shown in FIG. 4-A) and cut by the cutting blade 174 and thus loaded in the female mold 38.

When the male mold 34 and the female mold 38 are to be moved through the compression molding zone B, the male mold 34 is lowered by the mold relation control means comprised of the first cam groove 18 and the follower roller 158 cooperating with it, and the second cam groove 20 and the follower roller 168 cooperating with it. In the illustrated embodiment, the cylindrical member 94 and the solid cylindrical member 104 (also see FIG. 3) of the male mold 34 are first lowered to the position illustrated in FIG. 4-B. At this position, the abutting member 114 fixed to the lower end of the cylindrical member 94 is inserted in the through-hole 92 formed in the plate 90 of the female mold 38, and the lower surface of the abutting member 114 is brought into intimate abuttment against the upper surface of the first female mold defining member 66 of the female mold 38. Then, only the solid cylindrical member 104 is further lowered and held at its lower limit position shown in FIG. 4-C. At this time, the male mold defining member 122 positioned at the lower end of the solid cylindrical member 104 advances into the female mold 38 and acts on the plastic material 238 loaded in the female mold 38, whereby the plastic material 238 is compression-molded into a shape conforming to the mold space defined by the male mold defining member 122 lowered to the lower limit position and the first female mold defining member 66 and the second female mold defining member 68. In the illustrated embodiment, the plastic material 238 is compression-molded into a container closure 244 (see FIG. 4-E also) having a circular top panel wall 240 and a cylindrical skirt wall 242 extending downwardly from the peripheral edge of the top panel wall 240 (since in the illustrated state, the closure 244 is molded in an upside-down condition, the skirt wall 242 extends upwardly from the peripheral edge of the top panel wall 240). An annular seal portion 246 of a suitable shape is formed in the inside surface of the top panel wall 240 of the closure 244, and a female thread 248 is formed in the inside surface of the skirt wall 242. The outside surfaces of the top panel wall 240 and the skirt wall 242 of the container closure 244 are defined by the female mold 38, more specifically by the upper surface of the second female mold defining member 68 and the inner peripheral surface of the first female mold defining member 66. The inside surfaces of the top panel wall 240 and the skirt wall 242 of the container closure 244 are defined by the male mold 34, more specifically by the lower surface and the peripheral surface of the male mold defining member 122.

As is well known to those skilled in the art, it is extremely difficult, if not impossible, to load a predetermined amount of the plastic material required to mold the container closure 244 precisely in the female mold 38 in the material loading zone A. Accordingly, in the material loading zone A, it is the practice to load the plastic material 238 in the female mold 38 generally in an amount slightly in excess of the amount required to mold the closure 244, i.e. in excess of the volume of the aforesaid mold space. In conventional apparatuses for compression molding container closures, the excess of the plastic material 238 bulges out from the lower end of the skirt wall 242 during compression molding, thus forming so-called "burrs". It will be easily understood that the burrs must be removed after molded closure 244 have been taken out from the compression molding apparatus. The operation of removing the burrs is complex and requireds additional labor and time, and naturally results in a considerable increase in the cost of production.

In contrast, in the illustrated apparatus constructed in accordance with this invention, when the pressure acting on the plastic material 238 in the mold space exceeds a certain limit as a result of the amount of the plastic material 238 loaded in the female mold 38 exceeding the volume of the mold space during compression molding of the plastic material 238 by the male mold defining member 122 of the male mold lowered to the position shown in FIG. 4-C from the position shown in FIG. 4-B, the excessive pressure acts on the lower surface of the sliding piece 148 positioned centrally in the male mold defining member 122 of the male mold 34 whereby the sliding piece 148 is elevated against the elastic biasing action of the spring means 152 (FIG. 3). More specifically, in the illustrated embodiment, the sliding piece 148 defining the central portion of the inside surface of the top panel wall 240 of the container closure 244 is elevated according to the excess of the plastic material 238 loaded in the female mold 38, and therefore, a somewhat projecting portion corresponding to the excess of the plastic material 238 is formed at the central portion of the inside surface of the top panel wall 240 of the compression-molded closure 244. Since the excess of the plastic material 238 is thus disposed of, the formation of burrs which have to be removed later can be surely avoided. The projecting portion formed at the central part of the inside surface of the top panel wall 240 of the closure 244 according to the excess of the plastic material 238 filled in the female mold 38 generally does not adversely affect the function (the function of sealing the mouth-neck portion of a container) and appearance of the closure 244, and can be left as it is without removal.

In the illustrated embodiment, a somewhat projecting portion is formed at the central part of the inside surface of the top panel wall 240 of the closure 244 according to the excess of the plastic material 238 in the female mold 38. If desired, a somewhat projecting portion may be formed in other parts of the inside surface of the container closure 244 so long as it does not adversely affect the function and appearance of the closure 244. If further desired, instead of providing the sliding piece 148 in relation to the male mold defining member 122 of the male mold 34, it is possible to provide a similar sliding piece in relation, for example, to the second female mold defining member 68 of the female mold 38 and to form a somewhat projecting portion at the central part of the outside surface of the top panel wall 240 of the closure 244 according to the excess of the plastic material 238 loaded in the female mold 38. However, with this alternative, the projecting portion thus formed changes although to a very slight degree to make the appearance of the closure 244 somewhat different.

While the male mold 34 and the female mold 38 move from the downstream end of the compression molding zone B to the upstream end of the article discharge zone C, the male mold 34 is maintained at the position shown in FIG. 4-C, i.e. at an operating relation position at which it defines a mold space in cooperation with the female mold 38. During this time of movement, the molded closure 244 is cooled to a temperature at which it can be withdrawn from the male mold 34 and the female mold 38. Cooling of the closure 244 is accelerated by the cooling medium circulating through the circulating grooves 82 in the female mold 38 and the arcuate circulating grooves 140 (FIG. 3) and the circulating passages 142 in the male mold 34.

When the male mold 34 and the female mold 38 are moved through the article discharge zone C, the male mold 34 is elevated by the mold relation control means constructed of the first cam groove 18 and the follower roller 158 cooperating with it and the second cam groove 20 and the follower roller 168 cooperating with it which are described with reference to FIG. 3. In the illustrated embodiment, both the cylindrical member 94 and the solid cylindrical member 104 (see FIG. 3 also) of the male mold 34 are first elevated to the position shown in FIG. 4-D. During the elevation of the male mold 34 from the position shown in FIG. 4-C to the position shown in FIG. 4-D, the threaded portion on the peripheral surface of the male mold defining member 122 of the male mold 34 engages the female thread 248 formed by the above threaded portion on the inner surface of the skirt wall 242 of the closure 244, whereby the molded closure 244 and the male mold 34 are elevated together out of disengagement from the female mold 38. As shown in FIG. 4-D, the male mold 34 and the closure 244 are positioned above the chute constituting the article discharge means 182. Then, only the solid cylindrical member 104 of the male mold 34 is elevated further, and the male mold defining member 122 located at the lower end of the solid cylindrical member 104 is moved back into the abutting member 114 positioned at the lower end of the cylindrical member 94 as shown in FIG. 4-E. At this time, the closure 244 cannot be elevated incident to the elevation of the male mold defining member 122 because the forward end of the skirt wall 242 of the molded closure 244 makes contact with the under surface of the abutting member 114. Accordingly, the closure 244 is removed from the male mold defining member 122, dropped onto the article discharge means 182, and carried to a suitable place through the article discharge means 182.

The male mold 34 and the female mold 38 are further moved to the material loading zone A from the article discharge zone C. During their movement from the downstream end of the article discharge zone C to the upstream end of the press molding zone B, the male mold 34 is held at the elevated position shown in FIG. 4-E. At this time, in the heating zone shown by D in FIG. 2, the female mold 38 is heated by the heating means 184. As a result, the plastic material 238 loaded in the female mold 38 in the material loading zone A is prevented from being abruptly cooled, and maintained molten so that it can be easily compression-molded in the compression molding zone B.

According to the rotational plastic compression forming apparatus constructed in accordance with this invention, container closures 244 are successively compression-molded at fully high speeds during the continuous rotation of the male molds 34 and the female molds 38.

Figure 5:
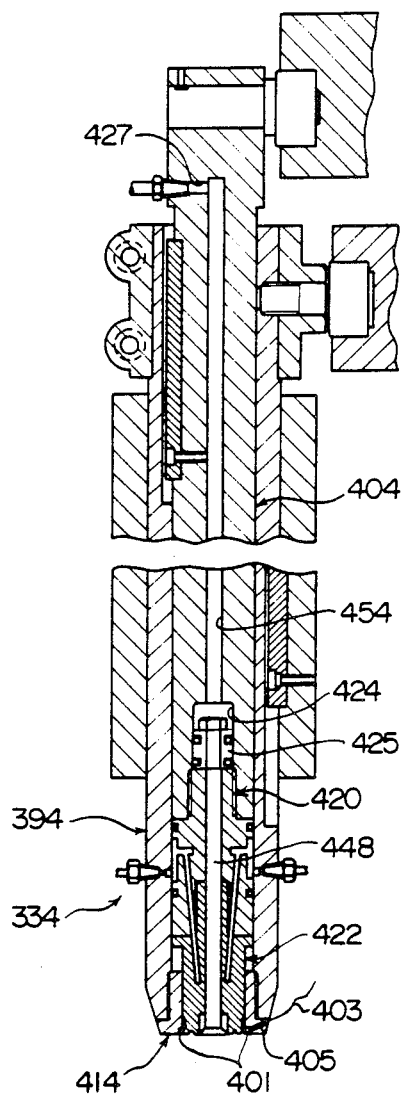
FIG. 5 is a partial longitudinal sectional view showing a modified example of the male mold.

FIG. 5 shows a modified example of the male mold. In a male mold shown generally at 334 in FIG. 5, a hole 424 formed in a solid cylindrical member 404 constitutes a fluid pressure cylinder. A piston member 425 positioned within the hole 424 is fixed to the upper end of a sliding piece 448. Following the hole 424, a hole 454 extends upwardly in the solid cylindrical member 404. The hole 454 constitutes a flow passage for a pressurized fluid such as pressurized oil, and is connected to a fluid pressure control circuit (not shown) through a communicating passage 427 disposed in the upper portion of the solid cylindrical member 404.

Figure 6:
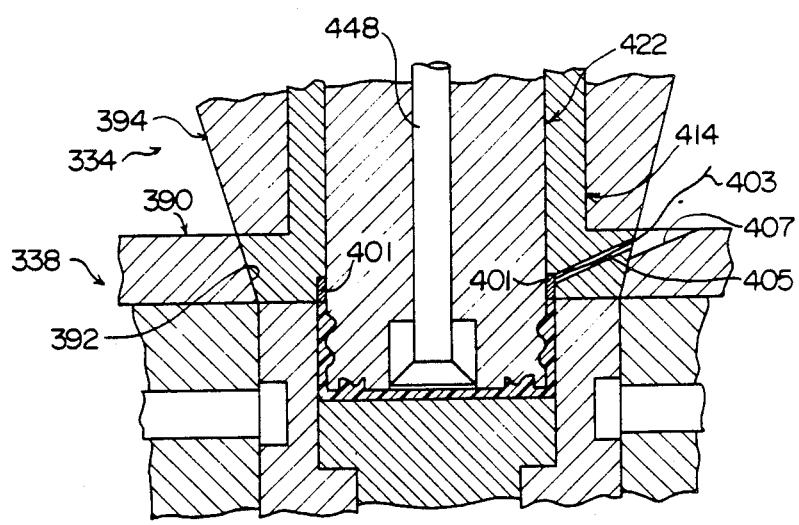
FIG. 6 is a partial longitudinal sectional view showing a part of the male mold shown in FIG. 5 together with a part of the female mold.

A suitable pressure detector 401 is disposed at the lower end of the inside surface of an abutting member 414 fixed to the lower end of a cylindrical member 394. A lead wire 403 of the pressure detector 401 is connected to a control electrical circuit (not shown) through an oblique hole 405 formed in the abutting member 414, as clearly shown in FIG. 6. A cut 407 is formed on the upper surface of a plate 390 in a female mold 338 so that when the abutting member 414 is inserted in a through-hole 392 formed in the plate 390 as shown in FIG. 6, the plate 390 does not interfere with the lead wire 403.

Otherwise, the structure of the male mold 334 shown in FIG. 5 is substantially the same as that of the male mold 34 described hereinabove.

In the male mold 334 described above, a pressurized fluid under a predetermined pressure is normally supplied to the hole 424 constituting a fluid pressure cylinder from the fluid pressure control circuit (not shown) through communicating passages 427 and 454, and by the action of the pressurized fluid, the sliding piece 448 is forcibly held at its normal position at which the lower end surface of the piston member 425 abuts against the upper end surface of an intermediate linking member 420. At this normal position, the lower surface of the sliding member 448 is positioned at substantially the same level as the lower surface of the male defining member 422. However, when the amount of the plastic material loaded in the female mold 338 becomes excessive and consequently the pressure acting on the plastic material in a mold space exceeds a certain limit during compression molding, the pressure detector 401 detects it, produces a signal and sends it to the control electrical circuit (not shown). As a result, the control electrical circuit selects a suitable selector valve such as an electromagnetic selector valve disposed in the fluid pressure control circuit to stop supplying the pressurized fluid to the hole 424 constituting a fluid pressure cylinder and open the hole 424 into a pressurized fluid reservoir through the hole 454 and the communicating passage 427. Thus, the forcible holding of the sliding piece 448 at the normal position by the action of the fluid pressure is released, and the sliding piece 448 is maintained free to move upwardly from the normal position. Accordingly, the excessive pressure exerted on the plastic material in the mold space acts on the lower surface of the sliding piece 448 to elevate it. Thus, when the male mold 334 shown in FIGS. 5 and 6 is used, too, the sliding piece 448 defining the central part of the inner surface of the top panel wall of the container closure is elevated according to the excess of the plastic material loaded in the female mold 338, and therefore, a somewaht projecting portion is formed at the central part of the inside surface of the top panel wall of the container closure according to the excess of the plastic material. The excess of the plastic material is thus disposed of.

While the present invention has been described in detail with reference to the preferred embodiments shown in the accompanying drawings, it should be understood that the present invention is not limited to these specific embodiments alone, and various changes and modifications are possible without departing from the scope of the invention.

What is claimed is:

1. A rotational plastic compression molding apparatus for compression molding a container closure having a top panel wall and a cylindrical skirt wall extending downwardly from the peripheral edge of the top panel wall, said apparatus comprising a plurality of circumferentially spaced female molds, each said female mold defining the outside surface of the top panel wall of the closure and at least a greater portion of the outside surface of the skirt wall, a plurality of circumferentially spaced male molds cooperating respectively with the plurality of the female molds, each said male mold defining the inside surface of the top panel wall of the closure and the inside surface of the skirt wall, rotationally driving means for rotating the female molds and the male molds in synchronism, thereby moving them round successively through a material loading zone, a compression molding zone and a closure discharge zone, mold relation control means for maintaining each said female mold and each corresponding male mold in a spaced-apart inoperative relation in the material loading zone and the closure discharge zone, and in an approaching operative relation to define a mold space therebetween in the compression molding zone, material loading means for loading a heat-melted plastic material into the female molds in the material loading zone, closure discharge means for discharging the compression-molded closure from between each said female mold and each corresponding male mold in the closure discharge zone, and each said male mold including a sliding piece disposed for free movement from its normal position in a direction away from the corresponding female mold, the forward end surface of the sliding piece defining the central part of the inside surface of the top panel wall of the closure, and spring means for elastically biasing the sliding piece of said normal position, whereby when the pressure acting on the plastic material in the mold space becomes excessive, the sliding piece is moved from the normal position in the direction away from the corresponding female mold against the elastic biasing action of the spring member.

2. The apparatus of claim 1 wherein the rotationally driving means rotates the female molds and male molds continuously.

3. The apparatus of claim 2 which further comprises heating means for heating at least the female molds at least between the closure discharge zone and the material loading zone, and cooling means for circulating a cooling medium at least to the female molds.

4. The apparatus of claim 3 wherein the heating means comprises a high frequency induction heater.

5. The apparatus of claim 3 wherein the cooling means circulates the cooling medium also to the male molds.

6. A rotational plastic compression molding apparatus for compression molding a container closure having a top panel wall and a cylindrical skirt wall extending downwardly from the peripheral edge of the top panel wall, said apparatus comprising a plurality of circumferentially spaced female molds, each said female mold defining the outside surface of the top panel wall of the closure and at least a greater portion of the outside surface of the skirt wall, a plurality of circumferentially spaced male molds cooperating respectively with the plurality of the female molds, each said male mold defining the inside surface of the top panel wall of the closure and the inside surface of the skirt wall, rotationally driving means for rotating the female molds and the male molds in synchronism, thereby moving them round successively through a material loading zone, a compression molding zone and a closure discharge zone, mold relation control means for maintaining each said female mold and each corresponding male mold in a spaced-apart inoperative relation in the material loading zone and the closure discharge zone, and in an approaching operative relation to define a mold space therebetween in the compression molding zone, material loading means for loading a heat-melted plastic material into the female molds in the material loading zone, closure discharge means for discharging the compression-molded closure from between each said female mold and each corresponding male mold in the closure discharge zone, and each said male mold including a sliding piece disposed for free movement from its normal position in a direction away from the corresponding female mold, the forward end surface of the sliding piece defining the central part of the inside surface of the top panel wall of the closure, and means for forcibly holding the sliding piece at said normal position releasably, whereby when the pressure acting on the plastic material in the mold space becomes excessive, the forcible holding action of said means is released to move the sliding piece from said normal position in the direction away from the corresponding female mold.

7. The apparatus of claim 6 wherein a pressure measuring device for measuring the pressure acting on each said male mold is provided, whereby when the measured value obtained by the pressure measuring device exceeds a predetermined value, the forcibly holding action of said means is released.

8. The apparatus of claim 6 wherein said forcibly holding means forcibly holds the sliding piece at the normal position by fluid pressure.

9. The apparatus of claim 6 wherein the rotationally driving means rotates the female molds and male molds continuously.

10. The apparatus of claim 9 which further comprises heating means for heating at least the female molds at least between the closure discharge zone and the material loading zone, and cooling means for circulating a cooling medium at least to the female molds.

11. The apparatus of claim 10 wherein the heating means comprises a high frequency induction heater.

12. The apparatus of claim 10 wherein the cooling means circulates the cooling medium also to the male molds.

13. A rotational plastic compression molding apparatus for compression molding a container closure having a top panel wall and a cylindrical skirt wall extending downwardly from the peripheral edge of the top panel wall, said apparatus comprising a plurality of circumferentially spaced female molds, each said female mold defining the outside surface of the top panel wall of the closure and at least a greater portion of the outside surface of the skirt wall, a plurality of circumferentially spaced male molds cooperating respectively with the plurality of the female molds, each said male mold defining the inside surface of the top panel wall of the closure and the inside surface of the skirt wall, rotationally driving means for rotating the female molds and the male molds in synchronism, thereby moving them round successively through a material loading zone, a compression molding zone and a closure discharge zone, mold relation control means for maintaining each said female mold and each corresponding male mold in a spaced-apart inoperative relation in the material loading zone and the closure discharge zone, and in an approaching operative relation to define a mold space therebetween in the compression molding zone, material loading means for loading a heat-melted plastic material into the female molds in the material loading zone, closure discharge means for discharging the compression-molded closure from between each said female mold and each corresponding male mold in the closure discharge zone, and each said female mold including a sliding piece disposed for free movement from its normal position in a direction away from the corresponding male mold, the forward end surface of the sliding piece defining the central part of the outside surface of the top panel wall of the closure, and spring means for elastically biasing the sliding piece to said normal position, whereby when the pressure acting on the plastic material in a mold space becomes excessive, the sliding piece is moved from said normal position in the direction away from the corresponding male mold against the elastic biasing action of the spring means.

14. The apparatus of claim 13 wherein the rotationally driving means rotates the female molds and male molds continuously.

15. The apparatus of claim 14 which further comprises eating means for heating at least the female molds at least between the closure discharge zone and the material loading zone, and cooling means for circulating a cooling medium at least to the female molds.

16. The apparatus of claim 15 wherein the heating means comprises a high frequency induction heater.

17. The apparatus of claim 15 wherein the cooling means circulates the cooling medium also to the male molds.

18. A rotational plastic compression molding apparatus for compression molding a container closure having a top panel wall and a cylindrical skirt wall extending downwardly from the peripheral edge of the top panel wall, said apparatus comprising a plurality of circumferentially spaced female molds, each said female mold defining the outside surface of the top panel wall of the closure and at least a greater portion of the outside surface of the skirt wall, a plurality of circumferentially spaced male molds cooperating respectively with the plurality of the female molds, each said male mold defining the inside surface of the top panel wall of the closure and the inside surface of the skirt wall, rotationally driving means for rotating the female molds and the male molds in synchronism, thereby moving them round successively through a material loading zone, a compression molding zone and a closure discharge zone, mold relation control means for maintaining each said female mold and each corresponding male mold in a spaced-apart inoperative relation in the material loading zone and the closure discharge zone, and in an approaching operative relation to define a mold space therebetween in the compression molding zone, material loading means for loading a heat-melted plastic material into the female molds in the material loading zone, closure discharge means for discharging the compression-molded closure from between each said female mold and each corresponding male mold in the closure discharge zone, and each said female mold including a sliding piece disposed for free movement from its normal position in a direction away from the corresponding male mold, the forward end surface of the sliding piece defining the central part of the outside surface of the top panel wall of the closure, and means for forcibly holding the sliding piece at said normal position releasably, whereby when the pressure acting on the plastic material in the mold space becomes excessive, the forcibly holding action of said forcibly holding means is released, and the sliding piece is moved from said normal position in the direction away from the corresponding male mold.

19. The apparatus of claim 18 wherein a pressure measuring device for measuring the pressure acting on each said female mold is provided, whereby when the measured value obtained by the pressure measuring device exceeds a predetermined value, the forcibly holding action of said forcibly holding means is released.

20. The apparatus of claim 18 wherein the forcibly holding means forcibly holds the sliding piece at said normal position by fluid pressure.

21. The apparatus of claim 18 wherein the rotationally driving means rotates the female molds and male molds continuously.

22. The apparatus of claim 21 which further comprises heating means for heating at least the female molds at least between the closure discharge zone and the material loading zone, and cooling means for circulating a cooling medium at least to the female molds.

23. The apparatus of claim 22 wherein the heating means comprises a high frequency induction heater.

24. The apparatus of claim 22 wherein the cooling means circulates the cooling medium also to the male molds.

* * * * *